INVENTOR.
NORMAN W. PARKER
BY
Alden D. Redfield
ATTORNEY.

March 17, 1953
N. W. PARKER
KEYED AUTOMATIC FREQUENCY CONTROL SYSTEM FOR TELEVISION RECEIVERS
2,632,050
Filed April 3, 1950
2 SHEETS—SHEET 2

INVENTOR.
NORMAN W. PARKER
BY Alden D. Redfield
ATTORNEY.

Patented Mar. 17, 1953

2,632,050

UNITED STATES PATENT OFFICE 2,632,050

KEYED AUTOMATIC FREQUENCY CONTROL SYSTEM FOR TELEVISION RECEIVERS

Norman W. Parker, Cincinnati, Ohio, assignor to Avco Manufacturing Corporation, Cincinnati, Ohio, a corporation of Delaware Application April 3, 1950, Serial No. 153,550

7 Claims. (Cl. 178—7.5)

The present invention, which is an improvement on the circuit disclosed in application, Serial No. 141,984 filed in the U. S. Patent Office on February 2, 1950 by Francis A. Wissel, et al., and assigned to the same assignee as the instant application, relates to improvements in automatic frequency control (AFC) circuits of the type employed in the deflection systems of television receivers. The invention also embraces novel method and circuit means for automatically controlling the pulse repetition frequency and time phase position of a deflection wave in such a manner as to take full advantage of the major portion of the standard television signal blanking period. While not limited to utility in a horizontal deflection system, the invention is of particular advantage therein.

Several of the major prior art circuits are described in an article by E. L. Clarke, page 497 et seq., "Proceedings of the Institute of Radio Engineers," vol. 37, No. 5, published by the Institute of Radio Engineers, at New York, N. Y., May 1949, and in an article by John A. Cornell, page 58 et seq., "Radio and Television News," vol. 43, No. 1, published by the Ziff-Davis Publishing Company, at Chicago, Ill., January 1950. In lieu of a detailed explanation of the circuitry involved therein, these two articles are to be considered as incorporated into the specification and a part thereof.

Indirectly synchronized automatic frequency control circuits in horizontal deflection systems have greatly improved the picture stability over and above that which has been realized from directly triggered scanning systems. This improvement inherently arises from the method employed in AFC systems of this type, whereby the scanning oscillator, in lieu of being controlled by a direct triggering pulse, is controlled by a D. C. sensing voltage which is developed by comparing the synchronizing pulses with reference pulses taken from the output of the deflection system, and by feeding the resultant comparison signal to an integrating network wherein it is "stored" and used for said control purposes. The inherent filtering action of the pulse integrating network eliminates rapid fluctuations in the scanning oscillator pulse repetition frequency, thereby eliminating horizontal tearing of the picture by single lines or groups of lines with a resultant picture stabilization not present in a directly triggered type.

In both the directly synchronized circuits and the indirectly synchronized circuits as used in horizontal deflection systems, however, it is necessary to maintain control over synchronization during the vertical scanning period. In the directly triggered system, little difficulty is encountered in holding synchronization during this portion of the television signal, since the vertical synchronizing pulse serrations duplicate to a considerable extent the triggering action of the horizontal synchronizing pulse. However, since indirectly synchronized AFC control circuits depend upon a D. C. "information" potential being developed by comparing the phase relationships between synchronizing pulses and feedback pulses, and since both the relatively narrow horizontal sync pulses and the serrated vertical sync pulses are fed to the phase comparison device, at least in horizontal deflection systems, there is a tendency to store erroneous voltage "information" during the vertical synchronizing period.

The type of AFC circuit herein shown involves a phase comparison device comprising a vacuum tube having a control electrode to which synchronizing pulses are fed and having a plate circuit to which keying pulses are fed from an output circuit of the horizontal deflection system. One of the concepts on which the present invention is based is the perception that the width of the feedback pulse is a primary factor in causing erroneous voltage information to be stored in an integrating network during the vertical synchronizing period. In the illustrative embodiment shown, the AFC control potential is developed by an integration of the plate current pulses in the phase comparison device, which occur during coincidence between sync pulses and gating pulses. I have discovered that these plate current pulses are of longer duration during the vertical synchronizing period than during the horizontal synchronizing period, and this factor tends to introduce error into the system. The duration of the plate current pulses can be made more uniform and this error minimized by sharpening or narrowing the feedback gating pulses applied to gate the phase comparison device. I am also aware that these gate pulses must have a certain minimum width in order to permit an increase in the duration of the plate current pulses when the necessity for developing a pull-in potential or an increased AFC potential arises. The circuit provided in accordance with the invention produces feedback gating pulses of adequate but not excessive width, and thus satisfies the requirements of adequacy to maintain gating sufficiently long to produce any AFC potential required, and elimination of excessive non-uniformity between plate current pulse duration or coincidence time during the horizontal synchronizing periods and during the vertical synchronizing periods.

Also, a further weakness of the indirectly synchronized automatic frequency control system, arises from the necessity of maintaining a fixed phase relationship between the retrace portion of the deflection wave and the blanking period of the television signal. The retrace period must be produced coextensively with the blanking period in order to eliminate the possibility of picture folding and modulation of the electron beam during retrace.

A primary object of this invention is to improve the synchronizing accuracy of indirectly synchronized automatic frequency control (AFC) system.

Another basic object of the present invention is to provide a pulse width modulation type of AFC circuit in which the feedback pulses developed for application to a phase comparison device are narrowed before application thereto as a sharpened gating pulse, thereby rendering the plate pulse output of the phase comparison device less dependent on the duration of synchronizing pulses applied thereto for phase comparison purposes. Otherwise stated, an object of the invention is so to shape the feedback pulses applied to the phase comparison device, in a pulse width modulation AFC system, as to minimize the tendency of the system to develop an output during the vertical synchronizing period which is not the same as the output developed during the horizontal synchronizing period and therefore not truly representative of the output which ideally should be developed to effect horizontal synchronizing. Still more broadly stated, an object of the invention is to overcome the inherent undesirable effect on pulse width modulation AFC systems which flows from the necessary non-uniformity between the vertical and horizontal synchronizing pulses. This object is accomplished by applying to the phase comparison device feedback pulses of adequate width to assure the development of any pull-in control potential that may be reasonably required, but not of such excessive width as to aggravate the undesirable effects of the above-mentioned non-uniformity.

A further object of the present invention is to phase-advance the retrace period of the saw-tooth current wave in the horizontal deflection system of a television receiver relative to the sync pulse so as to be able to utilize the major portion of the blanking period which is included in the standard television signal as specified by the Federal Communications Commission. Otherwise stated, it is a basic object of the present invention to produce a gating pulse simultaneously with a selected portion of the deflection wave whereby under synchronous conditions the retrace portion of the deflection wave is started and completed during the standard television blanking period.

In the illustrated embodiment of my invention I have employed an AFC system of the plate-gated or plate-keyed type which is similar to that disclosed in the above-mentioned Wissel et al. application, but differs therefrom in that the feedback pulse is simultaneously narrowed and delayed prior to being used to gate the phase comparison circuit. By narrowing the gating pulse, erroneous control voltage information is kept at a minimum during the vertical sync pulse period, and by delaying the gating pulse, the major portion of the blanking pulse is utilized to blank out the retrace.

For purposes of explaining that part of the illustrated embodiment which is used to develop a D. C. control potential for the horizontal AFC system, actual circuit operation can be considered to start when a sync pulse is applied during a gating period, and the phase comparison means passes current through an integrator type storage device. This current flow builds up a deflection oscillator control voltage in the integrating network which is proportional to the average coincidence between the gating pulse and a portion of the synchronizing pulse. A narrow gating pulse is developed by differentiating a feedback pulse generated simultaneously with retrace, which is of sufficient duration to maintain horizontal synchronism, but is not wide enough to permit accumulation of a harmful amount of erroneous voltage information in the integrating network during periods when the vertical sync pulses are applied to the circuit. Since the feedback pulse is produced simultaneously with the retrace portion of the deflection wave, the trailing portion or the "gating" portion of the differentiated feedback pulse occurs during the latter portion of the retrace period. The phase comparison means, therefore, generates a control potential which holds the latter part of the retrace period in coincidence with the synchronizing pulse period. This action makes retrace commence prior to the portion of the sync pulse used in normal synchronizing action, and therefore the major portion of the blanking period including the "front porch" is utilized.

For a better understanding of the present invention, together with other and further objects, advantages and capabilities thereof, reference is made to the following disclosure and appended claims in connection with the accompanying drawings, in which:

Figure 1:
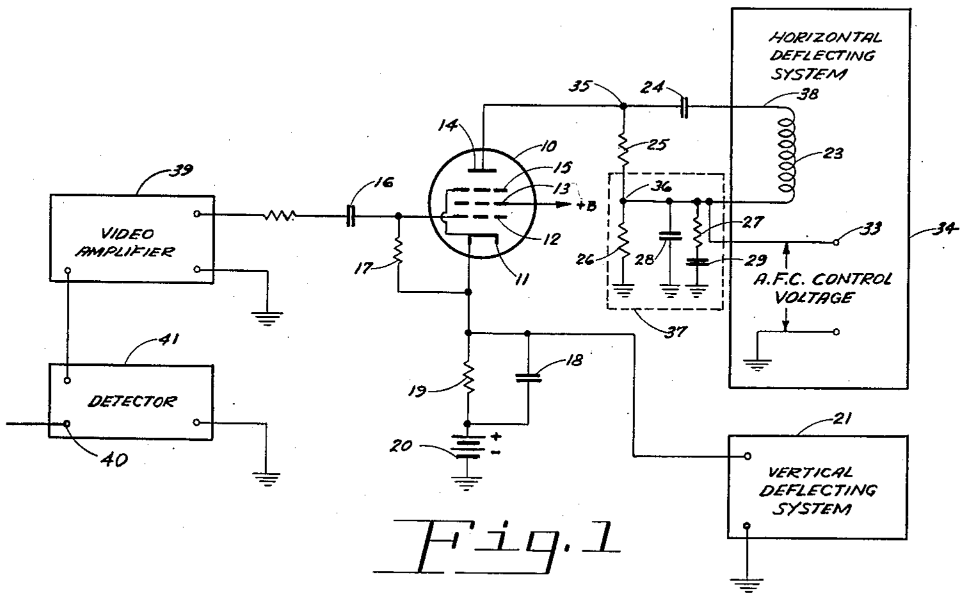
Fig. 1 is a circuit diagram showing the invention, conventional elements being shown in block form.

It will be understood as the description proceeds that the invention is not confined to the particular type of pulse width modulation system herein shown, but the information is of general utility in any system wherein a feedback pulse from the output of the deflection system is applied as a gating pulse to the pulse width modulation control tube. Plate-gated control tubes are shown in the above-mentioned copending patent application, Serial No. 141,984 of Francis A. Wissel et al., and also in my copending patent application Serial No. 141,942 filed in the U. S. Patent Office on February 2, 1950. In the illustrative embodiment of the invention herein shown, I have selected the general type of system disclosed in the aforementioned Wissel et al. copending patent application, and reference is made thereto for a detailed description of the control tube, per se, and the general operation thereof. Briefly, however, I provide for the performance of the functions of developing an AFC potential and of separating out stripped vertical synchronizing pulses a pentode 10, having a cathode 11, a control electrode or grid 12, a screen electrode or grid 13, a plate or anode 14, and a suppressor grid 15, the latter being here shown as connected to the cathode. The screen grid is operated at a relatively stable positive potential by connection to the source B+ (not shown). The grids 13 and 15, particularly the screen grid 13, provide electrostatic shielding which substantially eliminates capacity coupling between the plate 14 and the control electrode 12. Additionally, pentode 10 is conventionally operated so that the magnitude of space current is not substantially affected by the anode potential, and the screen grid so isolates the plate from the control grid that the number of electrons drawn away from the space charge is substantially independent of the plate voltage. The space current, even though it tends to be independent of plate voltage, does vary with control grid potential and tube 10 is so controlled that space current is confined to the periods of the horizontal and vertical synchronizing components. This means that, when no voltage is applied to anode 14, the anode circuit is not passing current at all. However, when a positive pulse is applied to anode 14, although the total space current does not substantially change, some of the electrons are diverted from the screen 13 to the plate 14, and the plate circuit then passes current.

In the immediately following portion of the description of tube 10 and its associated circuits, primary emphasis is directed to the functioning of the tube effectively as a triode sync clipper for purposes of amplitude-separating the synchronizing signals from the composite signals. It will be parenthetically observed that the same tube functions as a plate-keyed or plate-amplifier tube for horizontal AFC control potential developing purposes. The tube is grid-biased during actual television signal reception and has such a stable screen potential applied to it that space current flows only during the synchronizing signal portions of the composite signal applied to the control electrode.

Tube 10 is supplied with synchronizing signals through a coupling circuit from video amplifier 39. The last stage of the intermediate frequency amplifier (not shown) is connected to terminal 40 of a conventional second detector 41 in an intercarrier sound system, whose output is connected to the input of video amplifier 39, wherein both the composite video signal and the intermediate sound carrier are amplified. The composite video signal-output of the amplifier 39 is so poled that the synchronizing signals represent their maximum positive amplitude. Negative bias for the control electrode 12 (which for purposes of grid rectification may be likened to a diode plate) is developed across coupling capacitor 16 due to peak rectifying action. The discharge time constant of the grid bias network is determined by the parameters of capacitor 16 and grid resistor 17, the latter being connected between grid 12 and cathode 11. The control electrode circuit functions as a negative clamping circuit so that the peaks of the synchronizing pulses are effectively clamped at cathode potential and so that all portions of the composite signal below the superimposed synchronizing pulse level are cut off (those portions including video and pedestal), the composite signal being presented with such amplitude as to effect this operation. Otherwise stated, the grid bias network comprising capacitor 16 and resistor 17 cuts off all portions of the composite video signal below the level of the synchronizing pulse peaks, and both horizontal and vertical synchronizing pulses, along with the equalizing pulses, are fed to grid 12 of tube 10.

When a synchronizing pulse is impressed on control grid 12, space current flows substantially entirely in the screen electrode 13 circuit except during the portion of each synchronizing pulse which coincides with a plate circuit gating period. During the interval of concidence, space current also flows in the plate circuit.

It will be understood that space current flow in tube 10 is confined to the times when synchronizing pulses are applied to the control electrode, under conditions of actual reception of television signals. The description of the operation of tube 10 as given herein assumes the application of a composite television signal to the control electrode in the proper polarity and further assumes actual practical broadcast reception. Under those conditions control grid bias is developed. It will be understood that in the absence of a signal there is a steady DC component of screen current, no grid bias being developed under such conditions. However, this operating condition is not assumed in the description of the operation of this invention.

The cathode current pulses are applied to an integrating network comprising a parallel combination of a capacitor 18 and a resistor 19, connected between cathode 11 and ground through battery 20, this network functioning in a well-understood manner to convert the increasing energy during the vertical synchronizing signal period into a voltage pulse which is applied to the vertical deflecting system 21 in a known manner and utilized to control its action by direct triggering.

The horizontal deflection system illustrated by the block outline 34 is of the type which includes a deflection oscillator having a free-running frequency above the pulse repetition frequency of the sync pulses (approximately 16,000 cycles per second). However, it is parenthetically noted that the disclosed circuit can be modified to control a deflection oscillator having a free-running frequency which is lower than the pulse repetition frequency of the sync pulses, by effectively reversing the polarity of the voltage or control signal which is fed to the oscillator input circuit between terminal 33 and ground.

The description now proceeds to a discussion of the circuits and operation by which the AFC control poential is developed. As has been previously indicated, that control potential is derived from integrated pulses which are the resultant of a comparison of the phase relationships of synchronizing pulses applied to the grid of a control tube and gating pulses applied to the anode thereof.

The gating signal, applied to the anode-cathode circuit of tube 10, is impressed across a resistor 25, which is connected in series with an integrating network 37 consisting of resistors 26 and 27, and capacitors 28 and 29. Current flows through integrating circuit 37 whenever tube 10 conducts anode current. When terminal 35 of resistor 25 is positive and the control grid 12 of tube 10 is raised above cut-off by a sync pulse, current flows from terminal 35 through the anode 14 to cathode 11, integrating network 18—19, bias source 20 (which is illustrated as a fixed battery source but obviously is not restricted thereto) and through integrating circuit 37 to the negative terminal 36 of resistance 25. This current flow places a negative charge on the top plates of condensers 28 and 29, i. e., the condenser plates connected to terminal 36. When current ceases to flow, condensers 28 and 29 start to discharge; however, the long time constant discharge of condenser 29 through resistors 26 and 27 maintains a potential between terminal 33 and the ground which is proportionate to the average pulse duration through the anode-cathode path of tube 10.

In order to establish a gating pulse across resistance 25, containing voltage information as to the then existing phase position of the deflecting wave, a winding 23 is coupled to the output of the deflection system. Throughout the retrace period and simultaneous therewith, a voltage pulse is induced in winding 23 which makes terminal 38 negative with respect to terminal 36.

In the circuit of the abovementioned Wissel et al. copending patent application, a positive reference pulse, which is induced in the feedback winding, is directly applied as a gating pulse to the anode-cathode path of a phase comparison tube, similar to tube 10 shown in Fig. 1. Since the resulting gating pulse period lasts for the complete retrace period, and since the integrating network accumulates voltage information for the full duration of coincidence between the gating periods and the sync periods, including vertical and horizontal, it can be shown that the gating pulse coincides with an erroneously large portion of the vertical sync period, and a normally correct small portion of the horizontal sync period. This difference of coincidence time introduces an error which is proportional to the difference between the coincidence periods.

Figure 3:
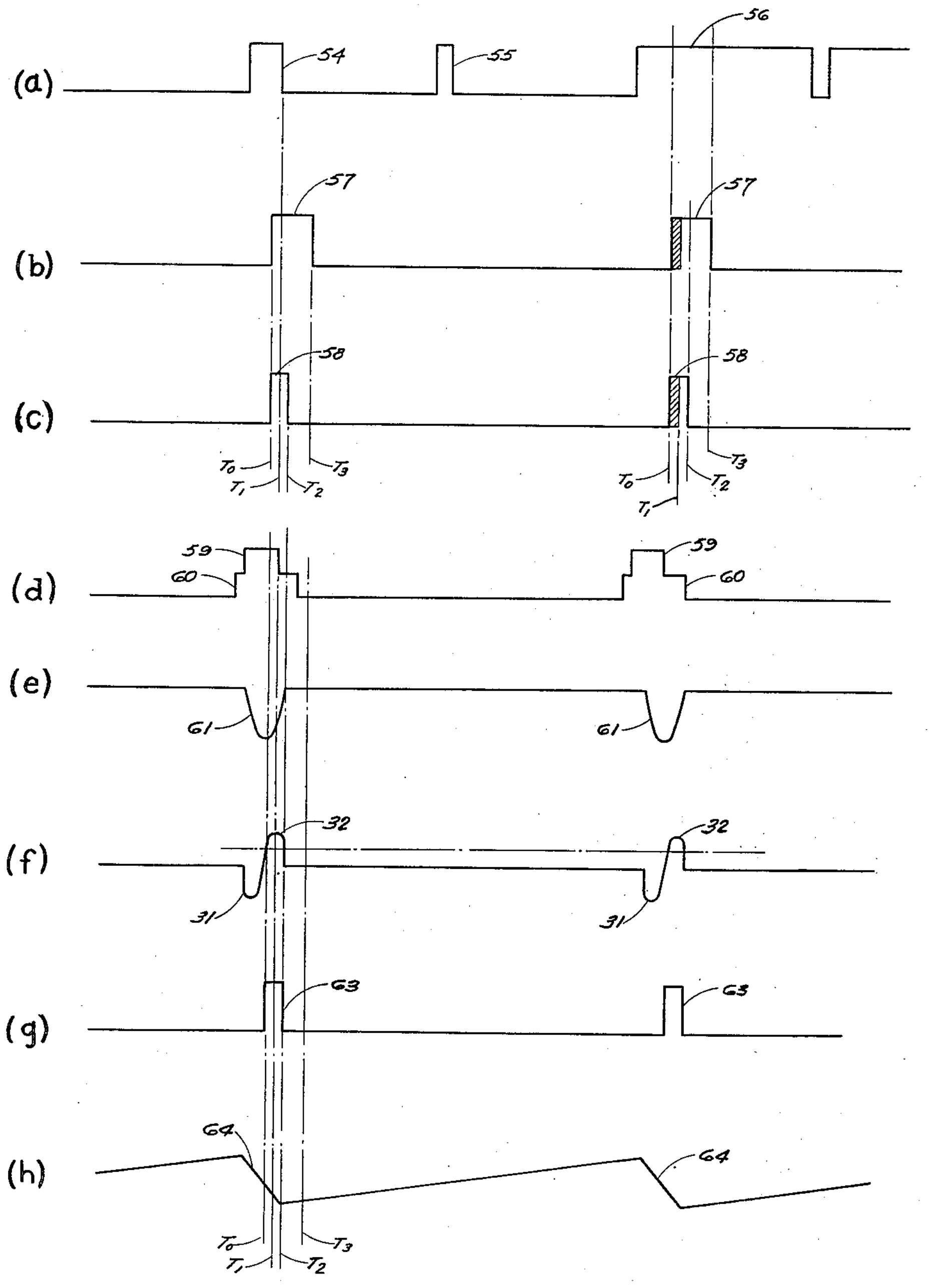

In order to show how such a wide gating pulse allows misinformation in the form of an undesired control voltage change to appear in the integrating circuit 37 during the vertical pulse period, reference is made to the curves of Fig. 3. Pulse 54, Fig. 3*a*, represents a horizontal sync pulse while pulse 55 represents an equalizing pulse preceding the vertical synchronizing pulse 56 in a standard composite television signal. Gating pulses 57, Fig. 3*b*, each having a duration equal to the retrace period, ideally represent typical gating pulses which are fed back to the anode-cathode path of the phase comparison tube in the Wissel et al. circuit. As can be seen from the figure, the first feedback pulse 57 has a normal phase position coinciding with the trailing portion of the first horizontal sync pulse 54, Fig. 3*a*, while the second gating pulse coincides with the leading portion of the vertical synchronizing pulse 56, Fig. 3*a*. The degree of coincidence between the horizontal sync pulse 54 and the first gating pulse 57, which is sufficient to maintain the oscillator in sync, is represented by the time period $T_0$—$T_1$. The overlap between the second gating pulse 57 and the vertical synchronizing pulse 56 is shown by the period between $T_0$—$T_3$, which is obviously longer than the period $T_0$—$T_1$ which is indicated by the shaded portion in the second pulse 57, since the time $T_0$—$T_3$ represents the full gating period. Therefore, the voltage information stored in the integrating circuit undesirably increases during the vertical synchronizing period, in proportion to the time period $T_1$—$T_3$.

Perhaps the undesirable effects resulting from use of a wide gating pulse can best be understood by comparing the duration of the phase comparison tube plate current flow during the vertical pulse period with the duration of the phase comparison tube plate current flow during the horizontal pulse period, under synchronous conditions. When the horizontal synchronizing pulse 54, which is impressed upon the control grid of the phase comparison tube coincides in time with the gating pulse 57, which is impressed across the plate circuit of the phase comparison tube, plate current flows during the period $T_0$—$T_1$, that is, the period of coincidence between these two pulses. This plate current also flows through the integrating network during the period $T_0$—$T_1$, and places a charge on the pulse integrating network which is just sufficient to maintain the correct oscillator frequency. The horizontal phase comparison tube, however, also receives the wide vertical synchronizing pulse 56, during the vertical synchronizing period. As is explained above, the vertical synchronizing pulse is integrated in the cathode circuit of the phase comparison tube and the resultant signal is fed to the vertical deflection system. However, during the period when the vertical synchronizing pulse is impressed on the control grid of the phase comparison tube, a gating pulse is also fed back from the horizontal deflection system, and impressed across the plate cathode circuit of said phase comparison tube. Since the vertical synchronizing pulse is much wider than a horizontal synchronizing pulse, it can be seen by comparing the second gating pulse 57 and vertical synchronizing pulse 56 in Fig. 3 that the period of coincidence between these two pulses lasts for the full period of the gating pulse. In other words, plate current flows through the comparison tube and the integrating network for the full duration of the gating pulse when it coincides with a vertical synchronizing pulse. Hence, the excess current flow between $T_1$ and $T_3$ undesirably increases the voltage information or sensing voltage stored in the integrating network during the vertical sync period.

It is a primary object of my invention to increase the accuracy of the voltage information accumulated or stored in the integrating circuit 37 by narrowing the gating period. It is also a primary object of my invention to utilize the major portion of the blanking period furnished by the synchronizing pulse pedestal in a standard television signal. For accomplishing these objects, in the illustrated embodiment of Fig. 1, I furnish a pulse distortion network comprising capacitor 24 and resistor 25, coupled across the source of negative feedback pulses, winding 23. Suitable parameters for capacitor 24 and resistance 25 are chosen so that they perform a differentiating function, thereby impressing a voltage across 25 similar to the curve shown in Fig. 2*b*.

Figure 2:
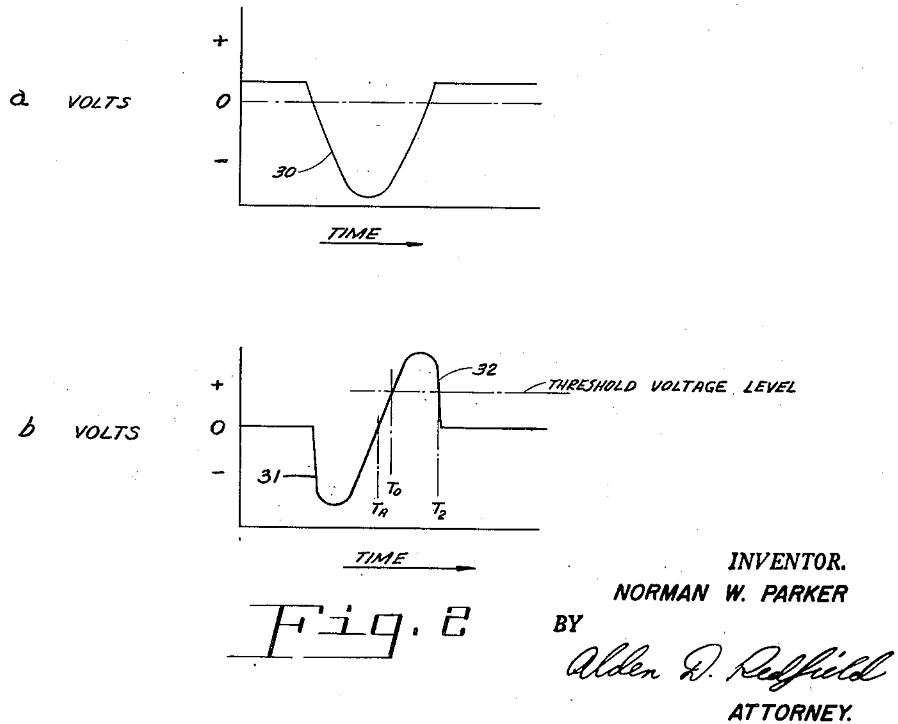
Figs. 2 and 3 are curves used to explain the operation of the circuit shown in Fig. 1.

As has been indicated in the discussion of the aforementioned Wissel et al. circuit, the normal gating pulse which is fed back to the phase comparison device has a shape such as that illustrated by the pulse 30 in Fig. 2, although of a different polarity. It has been indicated that the width of that type of gating pulse is a primary factor in introducing an error into the proper periods of coincidence during the vertical intervals. In accordance with the invention, each feedback pulse such as that indicated by the reference numeral 30 in Fig. 2*a* is differentiated or distorted into a resultant wave having two pips, the leading one of negative polarity and the lagging one of positive polarity. The narrow positive pip 32 alone is employed for gating purposes, and in this manner I avoid the prior use of a relatively wide pulse and I also avoid the abovementioned disadvantage of a wide gating pulse, viz., susceptibility to misinformation during the vertical interval. In cooperation with the means for providing a narrow gating pulse, I also provide another circuit arrangement which develops a bias and applies it to the cathode circuit of tube 10 in such a way that the gating interval is narrowed by an amount depending in part on the amount of that bias.

The bias source 20, shown as connected into the cathode circuit of tube 10, functions as a threshold potential, since it is poled so as to oppose the gating pulse whereby only the peak portion 32 is effective to drive anode 14 positive, relative to cathode 11. In other words, bias source 20 supplies a threshold potential above which the potential across resistance 25 must rise before plate current conduction in tube 10 is possible. Bias source 20 has been shown as having a fixed potential. However, it may be modified so as to be variable, in accordance with requirements dictated by the circuit parameters of the specific system in which the disclosed device is to be used. Keeping in mind that one object of the invention is to narrow the gating time during which plate current is able to flow through integrator 37, it can be seen from Fig. 2*b* that an increasing or decreasing of the magnitude of threshold bias source 20 decreases or increases, respectively, the duration of the possible gating time of the gating pulse. It can also be seen from Fig. 2*b* that the peak portion 32 of the gating pulse is much narrower than the original feedback pulse 30 which formerly has been used as a gating pulse in prior art circuits.

It should be understood that the gating pulse indicated by the reference numeral 32 in Fig. 2 and the gating pulses 58 and 63 in Fig. 3 are identical, the rounded pip shape being designated by the reference numeral 32 because that is a conventional mode for representing the wave form output of a differentiating network, the same wave being indicated by the reference numerals 58 and 63 in Fig. 3 because the operation of tube 10 is substantially independent of wave form, once the threshold potential thereof is attained.

Fig. 3*c* shows in idealized form the resulting narrow gating pulse 58 which is applied to tube 10 in my novel circuit. It will be seen that, so far as events which occur during the horizontal synchronizing period are concerned, the coincidence time $T_0$—$T_1$, representing the simultaneously occurring portions of the synchronizing pulse 54 and the gating pulse, is the same whether the gating pulse has the narrow width represented by pulse 58 or the broader width represented by pulse 57. However, the noncoinciding portions of the two gating pulses 57 and 58 are considerably different, as can be seen by comparing the duration of the noncoinciding period of pulse 58 represented by time interval $T_1$—$T_2$ with the duration of the noncoinciding portion of pulse 57 represented by the time interval $T_1$—$T_3$. The curves 3*a*, 3*b*, and 3*c* postulate that synchronism is being held. It will be seen that during synchronism, so far as phase comparison involving horizontal synchronizing pulses is concerned, it is not material whether the noncoinciding portion of the gating pulse width is narrow or wide so long as the width is sufficient to permit longer periods of coincidence when a greater AFC potential is required to develop a pull-in potential sufficient to restore synchronism once departed from. However, I have perceived that, so far as the operation of the phase comparison device during the vertical synchronizing period is concerned, the width of the gating pulse that does not coincide with the horizontal sync pulse 54 is a factor of great importance, as will be apparent from an inspection of the first three curves on the right hand side of Fig. 3. It will be seen that when a broad gating pulse 57 is employed, the integrating network 37, during vertical synchronizing intervals, is charged for the entire period from $T_0$ to $T_3$, which period is too long because, as is explained above, the charge built up by current conduction through integrator 37 during the period from $T_0$ to $T_1$ is all that is required to hold synchronism. However, I provide in accordance with the invention a relatively sharp or narrow gating pulse 58 whereby the integrating network is charged only during the period from $T_0$ to $T_2$ during the vertical sync pulse period, and the charge stored during this interval, which is considerably shorter than the interval $T_0$—$T_3$, much more closely approaches the corresponding charge which is stored during horizontal synchronizing intervals. Therefore, by cutting down the width of the gating pulse and reducing it to a width adequate to permit the fulfillment of pull-in AFC potential under all reasonably foreseen operating conditions, I have assured that a minimum of voltage misinformation will be stored in the integrating circuit 37 during vertical intervals and have more closely approached the ideally desirable condition of uniform storage of charge in the integrating circuit during both horizontal and vertical periods. Hence, the optimum gating pulse duration, which in the case of the illustrated embodiment is less than six hundredths (.06) of a line period, is selected by considering two factors viz: (1) "hold duration" which I define as that duration of coincidence between the gating pulse and the horizontal sync pulse, which is required to hold sync and phase once attained; and (2) the "pull-in duration" which I define as that extra duration of coincidence between the gating pulse and the horizontal sync pulse over and above the "hold duration" which is required to develop the maximum pull-in potential necessary to restore sync once lost.

So far as I am aware, no one has heretofore perceived the desirability of eliminating excess width of the gating pulse, and no one has heretofore realized that this excess width could be eliminated by employing a pulse shaping network for narrowing the feedback pulse. Also, so far as I am aware no one has heretofore perceived the desirability of eliminating the excess width of the gating pulse by phase adjusting that edge of the gating pulse which overlaps the sync pulse at synchronism and leaving the other edge of the gating pulse locked to a fixed point on the reference pulse, i. e. the end of retrace in the illustrated embodiment, whereby the reference pulse is also phase adjusted relative to the sync pulse. In the particular embodiment of the invention herein shown, I employ a differentiating network for accomplishing both of these desired functions.

The problem, solved by the second function of the differentiator, arises from the inherently slow retrace time realized in commercially used deflection systems. Commercially feasible mass produced deflection systems have a horizontal retrace period which is equal to approximately one-tenth (.1) of a horizontal line period, while the blanking interval, in a standard television signal, lasts for approximately sixteen-hundredths (.16) of a horizontal line period. Since the blanking pulse is used to cut off the electron beam in the picture tube during the retrace period it becomes clear that the retrace period must start with six-hundredths (.06) of a line period following the leading edge of the blanking pulse pedestal. Otherwise, the retrace period would extend beyond the trailing edge of the blanking pulse pedestal, thereby allowing picture signal modulation of the electron beam during the trailing portion of the retrace period with accompanying picture folding and other objectionable effects. This is a debility of many indirectly synchronized horizontal AFC circuits which arises from the fact that retrace is not started early enough relative to the leading edge of the blanking pulse pedestal so as to take full advantage of the major portion of the blanking period. As explained in the application, Serial No. 151,294, filed March 22, 1950, by Charles R. Edelsohn, now United States Patent 2,545,346, issued March 13, 1951, and assigned to the same assignee as the instant application, retrace can be completed in such systems during the blanking pulse period by delaying the feedback reference pulse to the phase comparator circuit.

In my novel circuit the feedback pulse, per se, is not delayed, but in lieu thereof is differentiated and narrowed, as is explained above, prior to being applied to a threshold biased phase comparator circuit, thereby making only that part of the trailing portion of the differentiated pulse, which is above a given threshold potential, effective to cause phase comparator action. Fig. 2*b* and Fig. 3*b* illustrate the relative phase position at synchronism of the wave form realized across resistance 25, when feedback pulse 61 is differentiated in differentiating network 24–25. The actual plate gating pulse, used in my circuit, has a shape similar to the portion of the trailing positive pip 32 which rises above the threshold bias potential level. However, for purposes of explanation, pulse 63 has been included as an idealized gating pulse wave form. The width of the gating pulse is controlled in part, as has been previously explained, by adjusting the magnitude of the threshold potential bias, and it should be noted at this point that the pulse narrowing action of this adjustment, in my preferred embodiment, works primarily on the leading edge of the gate pulse. That is, when the magnitude of the threshold potential bias is increased, the leading edge of the gating pulse is phase shifted relative to the feedback pulse 61 and the retrace pulse 64, without significant change to the time phase position of the trailing edge of the gating pulse relative to the feedback pulse 61 and the retrace pulse 64. This method of adjusting only one edge of the pulse to decrease gating pulse duration contributes special benefit toward the solution of the phasing problem encountered in attempting to blank out the cathode ray beam in the picture tube during the retrace portion of the horizontal deflection wave.

As can be seen by referring to Fig. 3*g*, the trailing edge of the gating pulse 63 is produced simultaneously with the end of deflection retrace pulse 64. Therefore, in the illustrated embodiment, if it is assumed that the magnitude of the threshold potential bias is raised during circuit operation and the gating pulse thereby narrowed, it is clear that the leading edge of the gating pulse is phase shifted relative to the retrace pulse, while the trailing edge of the gating pulse remains in coincidence with the end of the retrace pulse. At the same time, the leading edge of the gating pulse 63 slightly leads the trailing edge of horizontal sync pulse 59 thereby producing the resulting plate current flow in the phase comparison tube necessary to maintain a "hold" potential charge on the integrating circuit 37. As the gating pulse is narrowed by increasing threshold bias potential 20, the trailing edge of the gating pulse is moved closer to the trailing edge of the horizontal sync pulse, since the coincidence time between the two pulses is automatically maintained by the inherent action of the AFC system, thereby locking the leading edge of the gating pulse ahead of the trailing edge of the said sync pulse. The trailing edge of the gating pulse always coincides with the end of the retrace pulse 64. Hence, as the trailing edge of the gating pulse 63 moves toward the trailing edge of the horizontal sync pulse, it is seen that the end of retrace wave 64 also moves forward in time toward the trailing edge of the horizontal sync pulse. Since the trailing edge of the horizontal sync pulse has a substantially fixed time phase relationship with the trailing edge of the blanking pulse 60, this adjustment of the threshold bias also advances the phase position of the end of retrace pulse 64 relative to the end of the blanking period.

By analogy, the duration of the gating pulse can be likened to a connecting link between the sync pulse and the retrace pulse. One end of the link is fixed to the end of retrace. This can be seen by comparing Fig. 3*g* and Fig. 3*h*. The other end of the link is connected to the trailing edge of the sync pulse by inherent AFC control action as can be seen by comparing Fig. 3*g* with Fig. 3*d*. Therefore, the duration of the link or gating pulse determines how far the end of retrace lags the trailing edge of the horizontal sync pulse. Since the trailing edge of the blanking pulse lags the trailing edge of the horizontal sync pulse by approximately six-hundredths (.06) of a line period, the link or gate pulse can have a maximum duration of six-hundredths (.06) of a line period without allowing retrace to extend beyond the trailing edge of the blanking pedestal period. By using an optimum pulse duration for the link or gate pulse which is less than six-hundredths (.06) of a line pulse, I make certain that the end of retrace leads the trailing edge of the blanking pulse pedestal, and thereby utilize the major portion of the blanking period for blanking purposes.

The importance of working on the time phase position of the leading edge to narrow the gating pulse in lieu of varying the time phase position of the trailing edge of the gating pulse, now becomes clear. In the illustrated embodiment, the leading edge of the gating pulse is fixedly phase related to the horizontal sync pulse by inherent AFC action, therefore it follows that if the leading edge of the gating pulse is also fixedly phase related to the retrace pulse, time phase of adjustment of the trailing edge of the gating pulse relative to the retrace pulse has no effect on the time phase position of retrace.

Otherwise and more broadly stating the concept involved, phase adjustment between the order or sync pulse and the reference pulse or retrace pulse can be accomplished by phase adjusting that edge of the gating pulse which coincides with a portion of the order pulse, thereby leaving the other edge of the gating pulse in a fixed phase relationship with the reference pulse. This concept also holds true in an embodiment wherein the trailing edge of the gating pulse coincides with the leading portion of the order pulse. By adjusting the phase position of the coinciding edge, which in this case would be the trailing edge of the gating pulse, relative to the response pulse, the phase relationship between the response pulse and the order pulse is also adjusted because the leading edge of the gating pulse, in this case, remains fixed in time phase relation to a point on the order pulse.

While I do not desire to be limited to any specific circuit parameters, such parameters varying in accordance with individual designs, the following circuit values have been found entirely satisfactory in one successful embodiment of the invention, in accordance with Fig. 1.

| | |
|---|---|
| Capacitor 16 | .025 microfarads |
| Resistance 17 | 1 meghom |
| Tube 10 | 6AU6 |
| Resistance 19 | 1000 ohms |
| Capacitor 18 | .25 microfarads |
| Capacitance 24 | 100 micromicrofarads |
| Resistance 25 | 10,000 ohms |
| Resistance 26 | 150,000 ohms |
| Resistance 27 | 10,000 ohms |
| Capacitance 28 | .01 microfarad |
| Capacitance 29 | .25 microfarad |
| Bias Source (Battery) 20 | 0–50 volts |

While there has been shown and described what is at present considered the preferred embodiment of the present invention, it will be obvious to those skilled in the art that various changes and modifications may be made therein without departing from the invention as defined by the appended claims.

Having thus described my invention, I claim:

1. In a television receiver system the combination comprising a source of positive going sync pulses, an indirectly synchronized deflection oscillator of the D.-C. signal controlled type including a source of retrace pulses, an electron tube phase comparison device including a control electrode and an anode and having a current conduction path which passes current only during periods of coincidence between two positive going input signals, means coupling said sync pulses to the control electrode of said electron tube phase comparison device for supplying one of said input signals, differentiating means coupling said source of retrace pulses to the anode of said electron tube phase comparison device for supplying the second of said input signals, said differentiating circuit having circuit parameters suitable for distorting each retrace pulse into a waveform which includes a positive going pulse and a negative going pulse, the positive going pulse duration being less than the duration of the retrace pulse, and a load circuit connected in series with the phase comparison device current conduction path comprising an integration network having output terminals coupled to supply a D.-C. control signal to said deflection oscillator.

2. In a television receiver the combination comprising a D.-C. controlled deflection oscillator including a source of retrace pulses, an integrating network having an output circuit coupled to said deflection oscillator circuit and having two input terminals, a differentiating circuit having an input coupled to said source of retrace pulses for differentiating the retrace pulses and having two output terminals, a phase comparator vacuum tube means having a control grid and having a plate-cathode path connected in series circuit with the output terminals of said differentiating circuit and the input terminals of said integration network, a source of sync pulses coupled to said control grid, whereby said phase comparator tube plate-cathode path conducts only during periods of coincidence between positive going portions of the differential retrace pulses and the positive going portions of the sync pulses.

3. In a television receiver the combination comprising a D.-C. controlled deflection oscillator including a source of retrace pulses, an integrating network having an output circuit coupled to said deflection oscillator circuit and having input terminals, an R.-C. differentiating network having a time constant suitable for distorting a retrace pulse into positive and negative going pulse portions, said differentiating network having an input coupled to said source of retrace pulses and having output terminals, a phase comparator vacuum tube means having a control grid and a current conducting path controlled by said control grid, said conducting path being connected in series circuit with the ouput terminals of said differentiating network and the input terminals of said integrating network, and a source of sync pulses coupled to said control grid, whereby said phase comparator tube conduction path conducts only during periods of coincidence between positive going portions of the differentiated retrace pulses and the positive going portions of the sync pulses.

4. In a television receiver the combination comprising a D.-C. controlled deflection oscillator including a source of retrace pulses, a threshold bias potential source, an integrating network having an output circuit coupled to said deflection oscillator circuit and having input terminals, a differentiating network having an input coupled to said source of retrace pulses and having output terminals, a phase comparator vacuum tube means having a control grid and an anode-cathode current conducting path controlled by said control grid, said anode-cathode conducting path being connected in series circuit with the output terminals of said differentiating network, said threshold bias potential source and the input terminals of said integrating network, said threshold bias potential source being coupled between the cathode and an equi-potential plane common to one input terminal of said integrating network and being so poled as to oppose current flow in said conducting path until overcome, and a source of sync pulses coupled to said control grid, whereby current flows through said series circuit only during periods of coincidence between said sync pulses and the differentiated retrace pulses.

5. In a television receiver the combination comprising a D.-C. controlled deflection oscillator including a source of retrace pulses, a threshold bias potential source, an integration network having an output circuit coupled to said deflection oscillator circuit and having input terminals, pulse narrowing means comprising a differentiating network having an input coupled to said source of retrace pulses and having output terminals, said differentiating network having a suitable time constant for shaping said retrace pulses so as to include a narrowed positive going portion, a phase comparator vacuum tube means having a control grid and an anode-cathode current conducting path controlled by said control grid, said anode-cathode conducting path being connected in series circuit with the output terminals of said differentiating network, said threshold bias potential source and the input terminals of said integration network said threshold bias potential source being coupled between the cathode and equi-potential plane common to one terminal of said integration network and being so poled as to oppose current flow in said conducting path, and a source of sync pulses coupled to said control grid, whereby current flows in said conducting path only during periods of coincidence between positive going sync pulses and positive going portions of the differentiated retrace pulse.

6. In a television receiver of the type which includes a source of positive polarity composite video, horizontal and vertical synchronizing signals, a directly triggered vertical deflection system and an indirectly synchronized horizontal deflection system of the type which is controlled by a unidirectional frequency control potential, a circuit for separating synchronizing pulses from the composite signals and for developing the vertical triggering pulses and the unidirectional control potential comprising in combination: a vacuum tube having a separate space current path between each of two electrodes and a common cathode circuit, a control grid in said vacuum tube for controlling space current flow in both of said paths, a source of composite television picture signals coupled to said control grid, integrating circuit means connected into at least one of said two space current paths for producing a vertical deflection system triggering voltage, a positive current source for one of said electrodes, a pulse source which produces pulses simultaneously with the retrace portion of the deflection wave, differentiating means coupled to said pulse source for shaping and narrowing each of said pulses into a waveform having positive pulse portions, said differentiating means having two output terminals, one of which is connected to the other of said electrodes, integrating means coupling the other terminal of said differentiating means to said common cathode circuit for developing a control potential proportional to the space current flow through said other electrode, and biasing means for limiting space current flow in both of said space current paths to the period when a synchronizing pulse is applied to said control grid.

7. In a television receiver system the combination comprising an indirectly synchronized horizontal deflection system having two input terminals for receiving a D.-C. control potential and a source of retrace pulses having two output terminals, a capacitor and a resistor series network connected across the output terminals of the retrace pulse source, the parameters of said network being selected for differentiating said retrace pulse into a positive going and a negative going portion, each of said portions having less duration than said retrace pulse, a phase comparator tube having a plate-cathode circuit and a screen grid-cathode circuit under the control action of a control grid, an integration network having its output terminals connected across the input of the horizontal deflection oscillator system and having its input connected in series circuit with said resistor, and the plate-cathode path of said phase comparator tube, a threshold potential bias source connected into said last-mentioned series circuit for opposing current conduction therethrough until the potential across said resistor rises above the threshold potential level, and a source of horizontal synchronizing pulses coupled to said grid.

NORMAN W. PARKER.

REFERENCES CITED

The following references are of record in the file of this patent:

UNITED STATES PATENTS

| Number | Name | Date |
|---|---|---|
| 2,269,687 | Ruth | Jan. 13, 1942 |
| 2,312,982 | Stenning | Mar. 2, 1943 |
| 2,381,238 | Wendt | Aug. 7, 1945 |
| 2,457,140 | Frankel | Dec. 28, 1948 |
| 2,458,156 | Fredendall | Jan. 4, 1949 |
| 2,480,582 | Houghton | Aug. 30, 1949 |
| 2,519,911 | Kuperus | Aug. 22, 1950 |
| 2,559,038 | Bass | July 3, 1951 |
| 2,593,011 | Cotsworth | Aug. 15, 1952 |

FOREIGN PATENTS

| Number | Country | Date |
|---|---|---|
| 517,181 | Great Britain | Jan. 23, 1940 |
| 529,790 | Great Britain | Nov. 28, 1940 |
| 845,897 | France | Sept. 4, 1939 |
| 851,899 | France | Jan. 16, 1940 |

OTHER REFERENCES

Radio News, March 1948, page 68.